Sept. 4, 1951   G. H. LELAND   2,566,571
MOTION CONVERTING DEVICE
Filed May 18, 1948   2 Sheets-Sheet 1
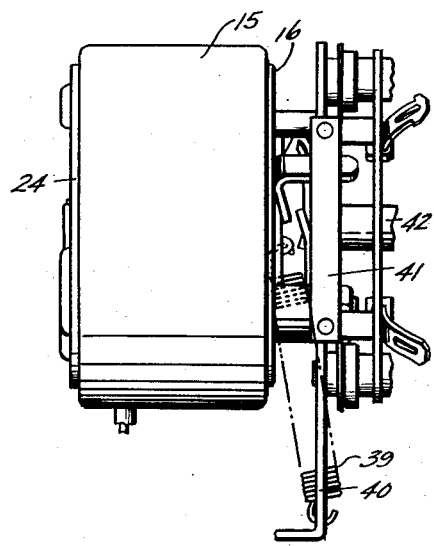
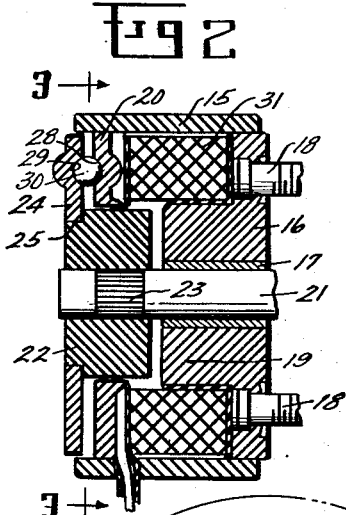
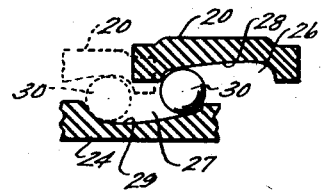
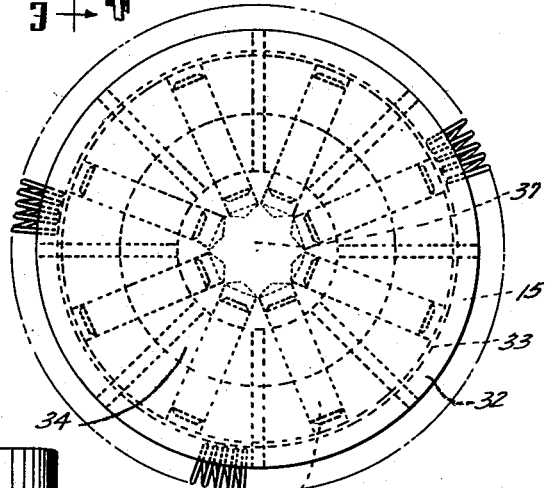
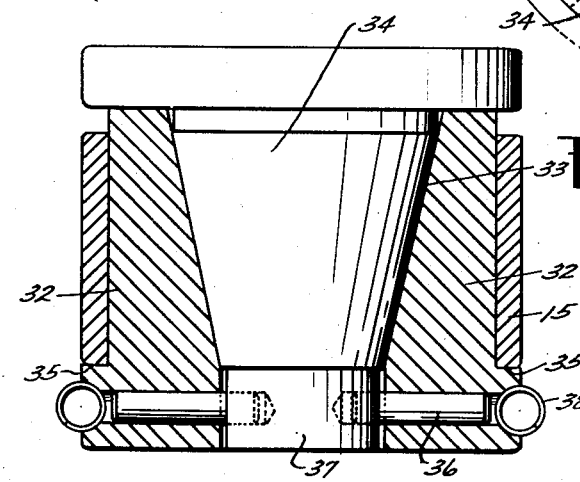
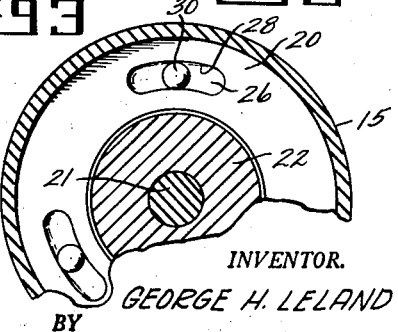
INVENTOR.
GEORGE H. LELAND
BY
His ATTORNEY

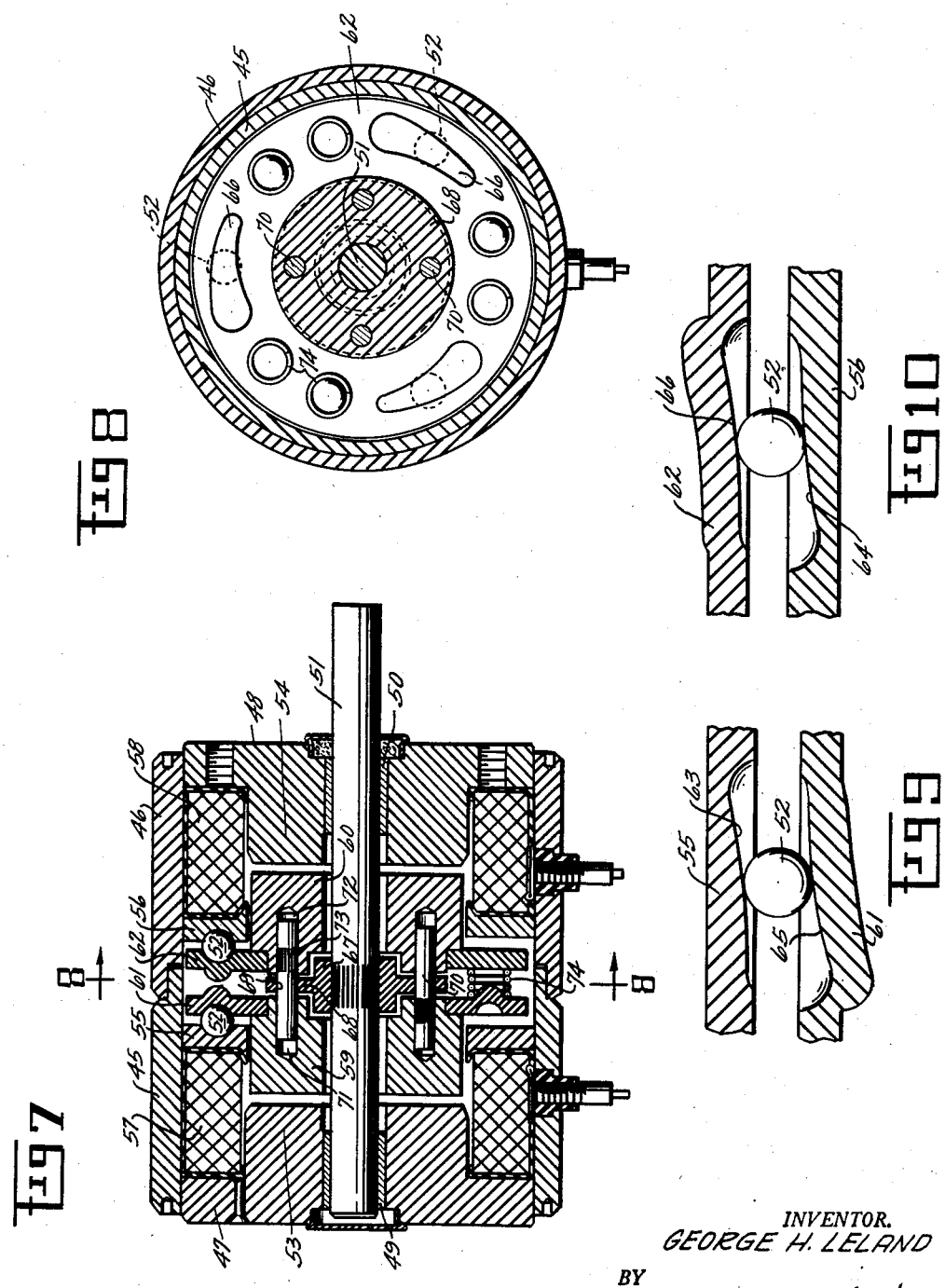

Patented Sept. 4, 1951

2,566,571

UNITED STATES PATENT OFFICE 2,566,571

MOTION CONVERTING DEVICE

George H. Leland, Dayton, Ohio

Application May 18, 1948, Serial No. 27,795

20 Claims. (Cl. 74—89)

This invention relates to an electromagnetic device and the method of producing the same, and more particularly to a rotary solenoid of the type shown in my application Serial Number 542,188, filed June 26, 1944, which issued on February 7, 1950, as Patent No. 2,496,880.

One object of the invention is to provide such a solenoid with increased power by more fully utilizing the magnetic flux from the magnetizing element.

A further object of the invention is to provide a rotary solenoid of a construction which facilitates production and lowers the cost of the solenoid.

A further object of the invention is to provide a rotary solenoid the power transmitting element of which may be selectively rotated in either of two directions.

A further object of the invention is to provide a rotary solenoid in which the combined axial and rotary movements of the armature will impart rotary movement only to the power transmitting element.

A further object of the invention is to provide a rotary solenoid comprising two electromagnets combined in a unitary structure for selective energization and the armatures of which have relative axial movement and rotate in unison.

A further object of the invention is to provide such a solenoid which may be deenergized at any position in its stroke and the parts retained in proper positions for rotation in either direction upon another energization thereof.

Other objects of the invention may appear as the device is described in detail.

In the accompanying drawings Fig. 1 is a side elevation of a rotary solenoid embodying the invention; Fig. 2 is a section taken axially through the solenoid of Fig. 1; Fig. 3 is a section taken on the line 3—3 of Fig. 2; Fig. 4 is a detail sketch showing the opposed inclined surfaces in the stationary and rotatable members of the solenoid; Fig. 5 is a section taken centrally through a device for expanding the cylindrical casing of the solenoid; Fig. 6 is a bottom plan view of the expanding device; Fig. 7 is a longitudinal section taken axially through a solenoid comprising two magnets; Fig. 8 is a section taken on the line 8—8 of Fig. 7; Fig. 9 is a section showing inclined surfaces of the stationary and rotatable elements of one magnet; and Fig. 10 is a similar view showing the inclined surfaces of the stationary and rotatable elements of the other magnet.

In these drawings I have illustrated two embodiments of my invention, one a rotary solenoid comprising a single magnet, and the other a rotary solenoid comprising two magnets, but it is to be understood that the solenoids as a whole, as well as the several parts thereof, may take various forms and may be assembled in various ways, without departing from the spirit of the invention.

In that embodiment of the invention shown in Figs. 1 to 4 the solenoid comprises a cylindrical casing 15, of magnetic material, in one end portion of which is mounted an end member, or end wall, 16, preferably by pressing the same into said end portion of the casing with a tight fit, the end wall being provided with an axial bearing 17. In the present instance the end wall is provided with openings to receive bolts 18 by which the solenoid may be mounted on a supporting structure. Arranged within the casing is a core 19 of a diameter less than the diameter of the casing and this core is here shown as formed integral with the end wall 16 and extending inwardly therefrom, the bearing extending through the core. Rigidly mounted in the other end portion of the casing is a member 20 here shown as annular in form and which is preferably pressed into the casing with a tight fit and is spaced inwardly a short distance from the adjacent end of the casing. Mounted in the bearing 17 is a shaft 21 which extends through and beyond the annular member 20. An armature 22 is rigidly mounted on the shaft and preferably extends through the opening in the annular member 20, as by pressing the same onto a serrated portion 23 of the shaft. This armature is of a diameter slightly less than the diameter of the opening in the annular member 20 and is narrowly spaced from the adjacent end of the core to provide between the core and the armature an air gap of the desired width.

Rigidly connected with the armature on the outer side of the annular member is a rotatable member 24 here shown as an annular plate pressed tightly on a reduced portion 25 of the armature. Thus the shaft, the armature and the member 24 move in unison. The rotatable member 24 is of a diameter slightly less than the internal diameter of the casing and extends radially from the armature to a position close to the end of the casing. Preferably it is located in or partially in the end portion of the casing so that there is no gap between the rotatable member and the casing. The annular member 20 and the rotatable member 24 are provided in their adjacent surfaces with a plurality of pairs of oppositely inclined surfaces. Preferably the two members are provided with opposed arcuate grooves 26 and 27 the bottom walls or bases 28 and 29 of which are inclined in opposite directions. Mounted between each pair of inclined surfaces is an antifriction element, such as a ball 30. The arrangement of the inclined surfaces is such that axial pressure of the rotatable member 24 on the balls will cause the latter to move lengthwise of the respective surfaces and thus impart rotary movement to the rotatable member 24, which movement is, of course, imparted to the armature and to the shaft. Supported in the casing about the core 19 and in the present instance between the annular member 20 and the marginal portion of the end wall 16 is a magnetizing device, such as the usual magnet coil 31. Thus it will be apparent that when the magnet is energized the armature will be moved axially toward the core and the pressure thus exerted by the rotatable member 24 on the balls will impart rotary movement as well as axial movement to the shaft. When the magnet is deenergized the armature and shaft may be returned to their initial positions in any suitable manner, as by a spring 39 connected with the rotatable member 24 and with a fixed part of the structure, such as a part 40 of a supporting structure on which the solenoid is mounted. In Fig. 1 the supporting structure also supports a device 41 in which is mounted a shaft 42 in alinement with the armature shaft 21, means being provided for connecting the two shafts during each operative movement of the power transmitting or armature shaft 21. This device forms no part of the present invention and need not be described in detail. Thus it will be apparent that the rotatable member 24 is so located with relation to the adjacent end of the casing 15, that the magnetic flux from the magnetizing element will embrace the rotatable element as well as other parts of the structure, thereby materially increasing the force exerted on the rotatable member 24 and the armature and correspondingly increasing the efficiency of the solenoid.

In order that the end wall 16 and the annular member 20 may be rigidly connected with the casing by a pressed fit it is important that at least the end portions of the casing be of an exact predetermined and uniform diameter. Such an exact diameter may be imparted to the casing in any suitable manner, as by an expanding device of the type shown in Figs. 5 and 6. That device comprises an annular series of wedge shaped members 32 the arcuate outer surfaces of which are arranged in a true circle. The inner edges of the members 32 converge downwardly and thus provide between said inner edges a frustro-conical opening 33 in which is inserted a frustro-conical member 34. The members 32 are provided adjacent their lower ends with shoulders 35 on which the cylinder 15 may rest, the cylinder, of course, being placed on the device while they are in their innermost or retracted positions. The members 32 are guided in a true radial direction by pins 36 mounted at their inner ends in a base member 37, separate from the conical member 34, and are retained normally in their retracted positions by a surrounding spring 38. Thus the downward pressure of the conical member 34 will expand the cylinder and this downward movement is so controlled that the cylinder will be expanded to an exact predetermined diameter.

When the casing has been provided with the required predetermined diameter the end wall is pressed tightly into one end portion of the cylindrical casing and the annular member 20 is pressed tightly into the other end portion of the casing and the shaft 21 is inserted in the bearing 17. Preferably the armature is pressed onto the shaft and the rotatable member 24 is pressed onto the armature before the shaft is inserted in the bearing. When the shaft is inserted in the bearing it is moved axially in a direction to properly space the armature from the core and to locate the rotatable member in the desired position with relation to the adjacent end of the casing, it being here shown in the plane of said end of the casing. It will be obvious that the construction of the solenoid is such that the several parts can be easily formed and then quickly assembled one with the other, thus enabling the solenoid to be produced at a relatively low cost.

In Figs. 7 to 10 there is shown a rotary solenoid comprising two separately energizable magnets the armatures of which are rotated in alternate directions by the energization of the respective magnets, thus enabling the shaft to be rotated in either direction about its axis by selecting and energizing the desired magnet. In the construction shown the solenoid comprises a cylindrical casing which is preferably formed in two sections, 45 and 46, which are rigidly connected one with the other in axial alinement. The two sections may be connected in any suitable manner, as by providing the same with overlapping parts having a pressed fit. Rigidly secured to the outer ends of the two sections of the casing are end walls 47 and 48 which are preferably mounted in the respective end portions and secured therein by a pressed fit. The end walls are provided with alined bearings 49 and 50 in which is mounted a shaft 51. In the form shown the two end walls are provided respectively with parts 53 and 54 forming cores which extend into the respective sections of the casing. Stationary members 55 and 56, preferably annular in form, are rigidly mounted in the inner portions of the respective sections, as by a pressed fit. Mounted between the annular members and the end walls of the respective sections are magnetizing elements 57 and 58, which extend about the respective cores. Supported between the cores 53 and 54 and about the shaft 51 are axially spaced armatures 59 and 60. Rigidly secured to the respective armatures, as by a pressed fit, are rotatable members or plates 61 and 62, which are arranged within the adjacent end portions of the respective sections of the casing and are spaced short distances, respectively, from the annular members 55 and 56. The rotatable members and the annular members in each section are provided with opposed inclined surfaces and antifriction elements 52, as described in connection with the device of Figs. 1 to 4, and these inclined surfaces are so arranged that the one armature will be rotated in one direction when its magnet is energized and the other armature will be rotated in the opposite direction when its magnet is energized. Preferably these inclined surfaces are in the nature of grooves having inclined bases, and as shown in Figs. 9 and 10 the inclined surface 63 of the annular member 55 slopes in the direction opposite the direction in which the inclined surface 64 of the stationary member 56 slopes, and the inclined surface 65 of the rotatable member 61 slopes in a direction opposite the slope of the inclined surface 66 of the rotatable member 62. Thus the axial movement of the armature 59 will cause that armature to be rotated in one direction and the axial movement of the armature 60 will cause that armature to be rotated in the opposite direction.

The armatures may be supported and connected with the shaft 51 in any suitable manner but preferably the armatures are so supported that they may have axial movement with relation to the shaft but the shaft will be caused to rotate therewith. In the arrangement shown there is mounted on the shaft 51, in a plane between the two armatures, a supporting device, which in the form here shown comprises a hub portion 67 rigidly connected with the shaft, preferably with a pressed fit, and a relatively thin radial portion 68 extending between the armatures and provided with a circumferential series of opening 69. A pin 70 extends through each opening in the part 68 of the supporting member and into alined sockets 71 and 72 in the respective armatures, it being understood that there are the same number of pairs of sockets as there are openings in the supporting member. It is desirable that the armatures should be axially movable with relation one to the other so that either armature may be attracted toward its core without imparting axial movement to the other armature. For this reason each pin 70 is rigidly mounted in one of the armatures, as by a pressed fit 73, and is slidably mounted in the other armature. In the present instance a part of the pins are rigidly mounted in the sockets of one armature and the remainder of the pins are rigidly mounted in the sockets of the other armature. Thus when either magnet is energized its armature will be moved axially and that movement will be converted into rotary movement and rotary movement will be imparted to the power transmitting shaft 51 but no direct axial movement will be imparted to the shaft.

Preferably the rotatable members 61 and 62 are yieldably urged toward the respective fixed members 55 and 56 to maintain the inclined surfaces of each pair of inclined surfaces in firm engagement with the anti-friction elements 52 and thus retain the latter in their proper positions with relation to said inclined surfaces when the magnets are deenergized. For this purpose a series of compression springs 74 are confined between the rotatable members, there being in the present instance three pairs of circumferentially spaced coil springs. With the anti-friction elements preloaded in this manner the unit may be deenergized in any position in its stroke and the anti-friction elements will be automatically retained in proper positions to impart rotation to the armatures in either direction when the unit is again energized.

While I have shown and described certain embodiments of my invention, I wish it to be understood that I do not desire to be limited to the details thereof as various modifications may occur to a person skilled in the art.

Having now fully described my invention what I claim as new and desire to secure by Letters Patent is:

1. In a rotary solenoid, a casing comprising a cylindrical portion, an end wall rigidly mounted in one end of said cylindrical portion and having an axial bearing, a core adjacent said end wall, an annular member rigidly mounted in said cylindrical portion of said casing adjacent to and spaced inwardly from the other end thereof, a shaft rotatably mounted in said bearing, an armature supported in said casing and connected with said shaft for rotation therewith, a magnetizing element supported about said core, an annular member connected with said armature for movement therewith, extending into the last mentioned end of said cylindrical portion and spaced from the first mentioned annular member, at least one of said annular members having in that side thereof adjacent the other member a plurality of inclined arcuate surfaces, and anti-friction elements supported between said members in engagement with said opposed inclined surfaces.

2. In a rotary solenoid, a casing comprising a cylindrical portion, an end wall rigidly supported in one end of said cylindrical portion and having an axial bearing, a core adjacent said end wall, an annular member rigidly mounted in said cylindrical portion of said casing adjacent to and spaced inwardly from the other end of the latter, a shaft mounted in said bearing for both axial movement and rotary movement, an armature movably supported in said casing and rigidly connected with said shaft, a magnetizing element supported in said casing about the said core, an annular member rigidly secured to said armature, extending into said other end of said cylindrical portion of said casing and spaced from the first mentioned annular member, said members having opposed oppositely inclined arcuate surfaces, and anti-friction elements spaced between said opposed inclined surfaces.

3. In a rotary solenoid, a casing comprising a cylindrical portion, an end wall mounted in one end of said cylindrical portion with a pressed fit and having an axial bearing, a core adjacent said end wall, an annular member mounted in said cylindrical portion with a pressed fit adjacent to and spaced inwardly from the other end thereof, a shaft in said bearing, an armature connected with said shaft by rotation therewith and supported in said annular member, a second annular member rigid with said armature and spaced a relatively short distance from that side of the first mentioned annular member which is remote from said end wall, said members having a plurality of pairs of oppositely inclined arcuate surfaces, anti-friction elements supported between the inclined surfaces of the respective pairs of inclined surfaces, and a magnetizing element supported in said cylindrical portion of said casing.

4. In a rotary solenoid, a casing comprising a cylindrical portion, an end wall mounted in one end of said cylindrical portion with a pressed fit and having an axial bearing, a core adjacent said end wall, an annular member mounted in said cylindrical portion of said casing with a pressed fit adjacent to and spaced inwardly from the other end thereof, a shaft mounted in said bearing and extending through said annular member, an armature rigid with said shaft, a second annular member rigidly connected with said shaft and extending into said cylindrical portion of said casing on the outer side of the first mentioned annular member, said members having a plurality of pairs of opposed oppositely inclined arcuate surfaces, an anti-friction element supported between the inclined surfaces of each pair of inclined surfaces, and a magnetizing element supported in said cylindrical portion of said casing.

5. In a rotary solenoid, a casing comprising a cylindrical portion, an end wall mounted in one end of said cylindrical portion with a pressed fit, having a part forming a core and having an axial bearing, an annular member mounted in said cylindrical portion with a pressed fit adjacent to and spaced inwardly from the other end thereof, a shaft mounted in said bearing and extending through said annular member, an armature rigidly connected with said shaft, a second annular member connected with said armature for movement therewith and extending into the last mentioned end of said cylindrical portion on the outer side of and spaced from the first mentioned annular member, said members having a plurality of pairs of opposed arcuate grooves, the grooves of each pair having oppositely inclined bases, anti-friction elements mounted in the grooves of the respective pairs of grooves, and a magnetizing element supported in said cylindrical portion of said casing.

6. In a rotary solenoid, a casing comprising a cylindrical portion, an end wall mounted in one end of said cylindrical portion with a pressed fit, having an inwardly extending portion constituting a core and having an axial bearing extending through said core, a magnetizing element supported in said cylindrical portion about said core, an annular member mounted in said cylindrical portion adjacent to and spaced inwardly from the other end thereof, a shaft mounted in said bearing for both rotary movement and axial movement and extending through said annular member, an armature rigidly secured to said shaft and supported by said shaft in said annular member and in narrowly spaced relation to said core, a plate rigidly secured to the outer end of said armature, extending into said other end of said cylindrical portion and spaced outwardly from said annular member, said plate and said annular member having a plurality of pairs of opposed arcuate grooves, the bases of grooves of each pair being inclined in opposite directions, and anti-friction elements supported in said grooves.

7. In a rotary solenoid, a casing comprising two cylindrical portions connected one with the other in axial alinement, an end wall rigidly mounted in the outer end of each cylindrical portion of said casing, said end walls having alined bearings, a core adjacent each end wall, annular members rigidly mounted in the respective cylindrical portions adjacent to and spaced from the connected ends thereof, a single shaft rotatably mounted in said bearings, an armature in each cylindrical portion of said casing, connected with said shaft for rotation therewith, annular members in said cylindrical portions between and spaced from the respective first mentioned annular members and connected with the respective armatures for rotation therewith, the annular members in each cylindrical portion of said casing having a plurality of opposed inclined surfaces, anti-friction elements spaced between each pair of said opposed surfaces, and a magnetizing element supported in each cylindrical portion of said casing.

8. An electromagnetic device comprising a casing including two alined sections rigidly connected one with the other, end walls mounted in the outer ends of the respective sections with a pressed fit and having alined bearings, annular members mounted in the inner end portions of the respective sections with a pressed fit and spaced inwardly from said inner ends, armatures supported in the inner end portions of the respective sections for axial movement and rotary movement, magnetizing elements for imparting axial movements to the respective armatures in different directions, means cooperating with the respective annular members and controlled by the axial movement of one armature for imparting rotary movement thereto in one direction and controlled by the axial movement of the other armature for imparting rotary movement thereto in a direction opposite the direction in which the first mentioned armature is rotated by its axial movement, a shaft in said bearings, and means for connecting said shaft with said armatures for rotation thereby.

9. An electromagnetic device comprising a casing including two alined sections rigidly connected one with the other, end walls mounted in the outer ends of the respective sections with a pressed fit and having alined bearings, annular members mounted in the inner end portions of the respective sections with a pressed fit and spaced inwardly from said inner ends, armatures supported in the inner end portions of the respective sections for axial movement and rotary movement, rotatable members rigidly connected with the respective armatures and supported thereby on the inner sides of and in spaced relation to the respective annular members, the rotatable member and the annular member of each section having opposed oppositely inclined surfaces, anti-friction elements supported between the respective opposed inclined surfaces, means for connecting said armatures for rotation in unison, a magnetizing element in each section, a shaft in said bearings, and means for connecting said shaft with said armatures for rotation thereby.

10. An electromagnetic device comprising a casing including two alined sections rigidly connected one with the other, end walls mounted in the outer ends of the respective sections with a pressed fit and having alined bearings, annular members mounted in the inner end portions of the respective sections with a pressed fit and spaced inwardly from said inner ends, armatures supported in the inner end portions of the respective sections for axial movement and rotary movement, rotatable members rigidly connected with the respective armatures and supported thereby on the inner sides of and in spaced relation to the respective annular members, the rotatable member and the annular member of each section having opposed oppositely inclined surfaces, anti-friction elements supported between the respective opposed inclined surfaces, means for connecting said armatures for rotation in unison and for axial movement with relation one to the other, a magnetizing element in each section, a shaft in said bearings, and means for connecting said shaft with said armatures for rotation thereby.

11. An electromagnetic device comprising two separately energizable electromagnets spaced one from the other and each including a core, two rotatable armatures supported between said cores for relative axial movements in different directions by the respective magnets, means controlled by the axial movement of one armature for rotating both armatures in one direction, means controlled by the axial movement of the other armature for rotating both armatures in the other direction, and a shaft connected with said armatures for rotation thereby.

12. In an electromagnetic device comprising a casing, end members secured to the respective ends of said casing, cores adjacent respective end members, armatures supported between said cores for axial movement with relation thereto, separately energizable magnetizing elements supported about the respective cores, stationary annular members supported adjacent the respective armatures and spaced one from the other, rotatable members connected with the respective armatures for movement therewith and supported between said stationary annular members, each stationary member and the corresponding rotatable member having opposed oppositely inclined surfaces, anti-friction elements supported between said inclined surfaces, whereby the axial movements of said armatures will cause the same to rotate, a shaft, and means for connecting said shaft with said armatures for rotation thereby.

13. In an electromagnetic device, a casing comprising alined sections rigidly connected one with the other, an end wall rigidly secured to the outer end of each section and having an axial bearing, and a core extending about said bearing, a member rigidly mounted in each section in spaced relation to the inner end thereof and having an axial opening therein, a magnetizing element supported in each section between said member and said end wall, armatures supported in the openings in the respective members and each having an axial opening, a shaft mounted in said bearings and extending through said armatures, means for connecting said shaft with said armatures for movement thereby, a rotatable member secured to each armature and supported adjacent the rigidly mounted member in which said armature is supported, and means controlled by the axial movements of said armatures for imparting rotation thereto, including anti-friction elements between said rotatable members and the corresponding rigidly mounted members.

14. In an electromagnetic device, a cylindrical casing, end walls mounted in the respective outer end portions of said casing with a pressed fit and having alined bearings and inwardly extending parts forming cores, stationary annular members mounted in said casing with a pressed fit and spaced from the respective end walls, separately energizable magnetizing elements supported between the respective annular members and the corresponding end walls, a shaft mounted in said bearings, armatures supported about said shaft for axial movement by the respective magnetizing elements when said elements are energized, means cooperating with the respective annular members and controlled by the axial movements of said armatures for rotating the latter, and means for connecting said shaft with said armatures for rotation thereby.

15. In an electromagnetic device, a cylindrical casing, end walls mounted in the respective end portions of said casing and having alined bearings and inwardly extending parts forming cores, means for separately energizing said cores, a shaft mounted in said bearings, rotatable armatures supported about said shaft between said cores for axial movement by the respective cores when energized, means controlled by said axial movements of said armatures for rotating said armatures in different directions, a supporting member secured to said shaft for rotation therewith, and means for connecting said armatures with said supporting member for rotation therewith and for axial movement with relation thereto.

16. In an electromagnetic device, a cylindrical casing, end walls mounted in the respective end portions of said casing and having alined bearings and inwardly extending parts forming cores, means for separately energizing said cores, a shaft mounted in said bearings, rotatable armatures supported about said shaft between said cores for axial movement by the respective cores when energized, means controlled by said axial movements of said armatures for rotating said armatures in different directions, a supporting member secured to said shaft for rotation therewith and having a part extending between said armatures, and pins carried by said part of said supporting member and extending into said armatures.

17. In an electromagnetic device, a cylindrical casing, end walls mounted in the respective end portions of said casing and having alined bearings and inwardly extending parts forming cores, means for separately energizing said cores, a shaft mounted in said bearings, rotatable armatures supported about said shaft between said cores for axial movement by the respective cores when energized, means controlled by said axial movements of said armatures for rotating said armatures in different directions, a supporting member secured to said shaft for rotation therewith and having a part extending between said armatures, and pins carried by said part of said supporting member and extending into said armature, each pin being slidably mounted in one of said armatures and rigidly mounted in the other of said armatures.

18. In an electromagnetic device, two alined armatures supported for both axial movement and rotary movement, separately energizable magnetizing elements for imparting axial movements to the respective armatures, separate means controlled by the axial movements of the respective armatures and including anti-friction elements for imparting rotary movements to said armatures, means for maintaining yieldable pressure on said anti-friction elements to prevent the displacement thereof when said magnetizing elements are deenergized, and means for connecting said armatures with a device to be rotated.

19. An electromagnetic device comprising a casing, end members secured to the respective ends of said casing, annular members rigidly mounted in said casing in spaced relation to said end members and spaced one from the other, armatures supported by said casing adjacent said annular members for axial movement and rotary movement, separately energizable magnetizing elements to impart axial movement to the respective armatures, a rotatable member secured to each armature for movement therewith and extending radially therefrom in spaced relation to the corresponding annular member, each rotatable member and the corresponding annular member having a plurality of pairs of opposed oppositely inclined surfaces, anti-friction elements supported between the opposed surfaces of the respective pairs of inclined surfaces to convert axial movement into rotary movement, means for yieldably urging each rotatable member toward the corresponding annular member to prevent the displacement of said anti-friction elements when the magnetizing element for the corresponding armature is deenergized, a shaft, and means for connecting said shaft with said armature for rotation thereby.

20. An electromagnetic device comprising a casing, end members secured to the respective ends of said casing, annular members rigidly mounted in said casing in spaced relation to said end members and spaced one from the other, armatures supported by said casing adjacent said annular members for axial movement and rotary movement, separately energizable magnetizing elements to impart axial movement to the respective armatures, a rotatable member secured to each armature for movement therewith and extending radially therefrom in spaced relation to the corresponding annular member, each rotatable member and the corresponding annular member having a plurality of pairs of opposed oppositely inclined surfaces, anti-friction elements supported between the opposed surfaces of the respective pairs of inclined surfaces to convert axial movement into rotary movement, compression springs interposed between said rotatable members, a shaft, and means for connecting said shaft with said armatures for rotation thereby.

GEORGE H. LELAND.

REFERENCES CITED

The following references are of record in the file of this patent:

UNITED STATES PATENTS

| Number | Name | Date |
|---|---|---|
| 1,802,459 | Caruso | Apr. 28, 1931 |
| 2,110,033 | Bostick | Mar. 1, 1938 |
| 2,227,328 | Steiss | Dec. 31, 1940 |
| 2,423,750 | Benson | July 8, 1947 |
| 2,449,178 | Sansbury | Sept. 14, 1948 |
| 2,449,438 | Wisegarver | Sept. 14, 1948 |

FOREIGN PATENTS

| Number | Country | Date |
|---|---|---|
| 659,975 | Germany | Apr. 21, 1938 |